United States Patent [19]

Tanaka et al.

[11] Patent Number: 5,044,496

[45] Date of Patent: Sep. 3, 1991

[54] CASE

[75] Inventors: Kimio Tanaka, Saku; Haruo Shiba, Komoro, both of Japan

[73] Assignee: TDK Corporation, Japan

[21] Appl. No.: 336,105

[22] Filed: Apr. 11, 1989

[30] Foreign Application Priority Data

Apr. 26, 1988 [JP] Japan .................. 63-55258[U]

[51] Int. Cl.$^5$ ............................................ B65D 85/672
[52] U.S. Cl. .................: .................. 206/387; 206/591; 264/269
[58] Field of Search ............... 206/307, 309, 387, 523, 206/524.2, 521, 591; 220/461; 156/245; 264/260, 269; 428/34.7, 36.8

[56] References Cited

U.S. PATENT DOCUMENTS

| 3,396,062 | 8/1968 | White | 156/245 |
|---|---|---|---|
| 3,419,455 | 12/1968 | Roberts | 156/245 |
| 3,604,556 | 9/1971 | Schwartz | 206/387 |
| 3,613,871 | 10/1971 | Evans | 206/387 |
| 3,640,379 | 2/1972 | Weingarden | 206/387 |
| 3,725,120 | 4/1973 | Suter | 220/461 |
| 3,893,585 | 7/1973 | Morrison et al. | 206/387 |
| 4,002,355 | 1/1977 | Sendor | 206/387 |
| 4,333,565 | 6/1982 | Woods | 206/591 |
| 4,339,039 | 7/1982 | Mykleby | 206/591 |
| 4,432,827 | 2/1984 | Graetz et al. | 206/387 |
| 4,495,125 | 1/1985 | Hatakeyama et al. | 264/269 |
| 4,554,125 | 11/1985 | Knapp | 156/245 |
| 4,626,455 | 12/1986 | Karabedian | 428/34.7 |
| 4,650,072 | 3/1987 | Ackeret | 206/387 |
| 4,703,161 | 10/1987 | McLean | 206/523 |
| 4,717,021 | 1/1988 | Ditzig | 206/387 |
| 4,718,550 | 1/1988 | Johnson | 206/387 |
| 4,733,806 | 3/1988 | Sloop | 206/523 |
| 4,904,324 | 2/1990 | Heider | 156/245 |

Primary Examiner—Jimmy G. Foster
Attorney, Agent, or Firm—Wood, Phillips, Mason, Recktenwald & VanSanten

[57] ABSTRACT

A case consisting of a cover and a case body adapted to mate to form a space for holding a given object has an outside and/or inside layer made wholly or partly of a thermoplastic elastomeric resin. The outside layer is formed of a thermoplastic elastomeric material selected from the group consisting of styrenic, olefinic, esteric, urethanic, polybutadienic, and vinyl chloride type thermoplastic elastomeric materials, and the inside layer is formed of a plastic material selected from the group consisting of polymethyl methacrylate, acrylonitrile-styrene copolymer, polycarbonate, acrylonitrile-butadiene-styrene, polystyrene, polybutylene terephthalate, high-impact polystyrene and the like, or vice versa.

6 Claims, 3 Drawing Sheets

FIG. 1
FIG. 2
FIG. 3
FIG. 4
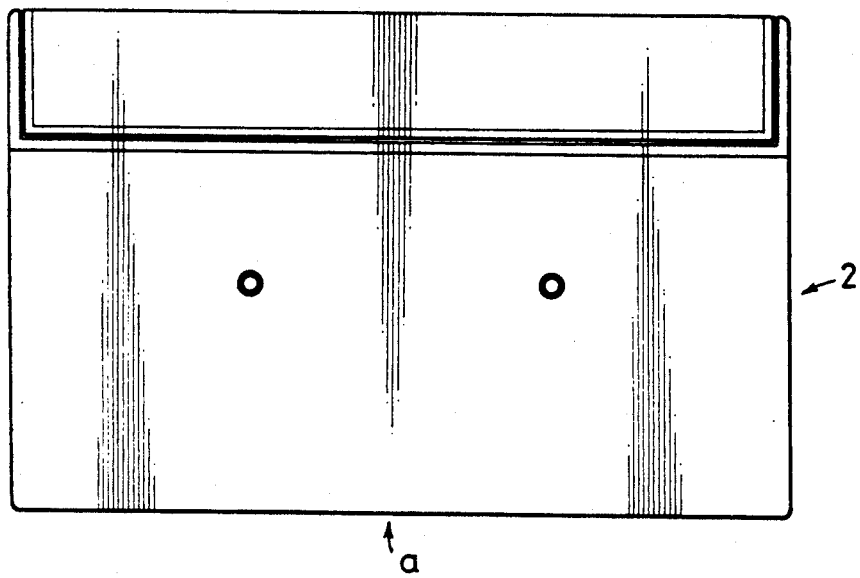
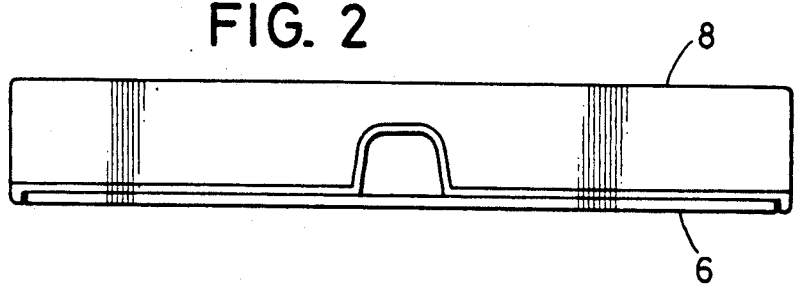
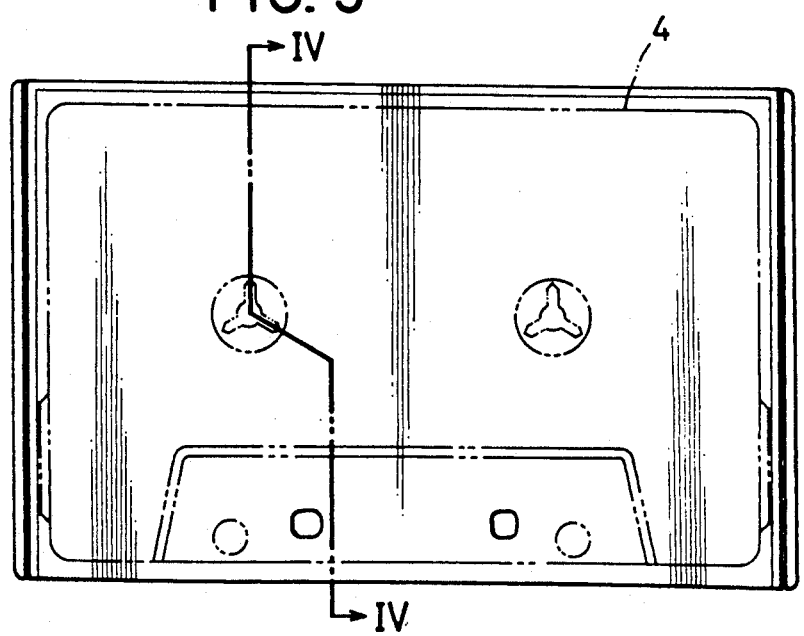
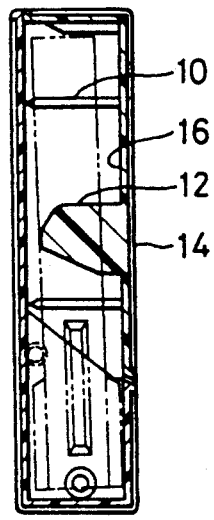

CASE

BACKGROUND OF THE INVENTION

This invention relates to a case, and more specifically to a case for holding a magnetic recording medium or other similar object.

Customarily a magnetic recording medium or the like is transported or stored as contained in a case. The case for such purpose usually is made of cardboard or plastics. For example, a plastic case 1 illustrated in FIGS. 10 to 14, for holding a cassette tape, comprises a cover 3 and a case body 5. The body 5 has ribs 9 for supporting the cassette tape 7 contained and lugs 11 for positioning the cassette, both formed inside in one piece with the body walls. The ribs and other protrusions are generally provided with some clearances between themselves and the cassette tape in the case. In a running automobile or other environment that involves vibration, the case tends to rattle as the clearances permit the cassette tape to strike against the inner walls of the case. This noise can be compounded by rattling of cases themselves where two or more such cases hit together. There is another possibility of the tapes scuffing or scratching each other, at a loss of the product quality. When the outer surface of a cassette and the inner surface of the case are caused to rub against each other, scuffing or scratching produces powder from the two parts. The powder in turn can deposit on the tape surface, increasing the dropout during playback. Moreover, their generally low coefficients of friction causes such plastic cases to slip out of the hand of the user, often to be broken.

SUMMARY OF THE INVENTION

In view of the above, the present invention aims at providing a case which abates the noise, scuff, and scratch that result from the vibration of an object inside the case or of cases in contact and prevents the user from dropping the case by careless handling.

According to the invention, a case consisting of a cover and a case body adapted to mate to form a space for holding a given object is provided which is characterized in that an outside and/or inside layer of the case is wholly or partly formed of a thermoplastic elastomeric resin.

BRIEF DESCRIPTION OF THE DRAWINGS

FIG. 1 is a rear view of a case for holding a cassette tape, with a layer of thermoplastic elastomeric material formed as an outside layer of the case;

FIG. 2 is a side view of the case as seen in the direction of the arrow a in FIG. 1;

FIG. 3 is a front view of the case of FIG. 1;

FIG. 4 is a transverse sectional view taken on the line IV—IV of FIG. 3;

DETAILED DESCRIPTION OF THE INVENTION

Figure 5:
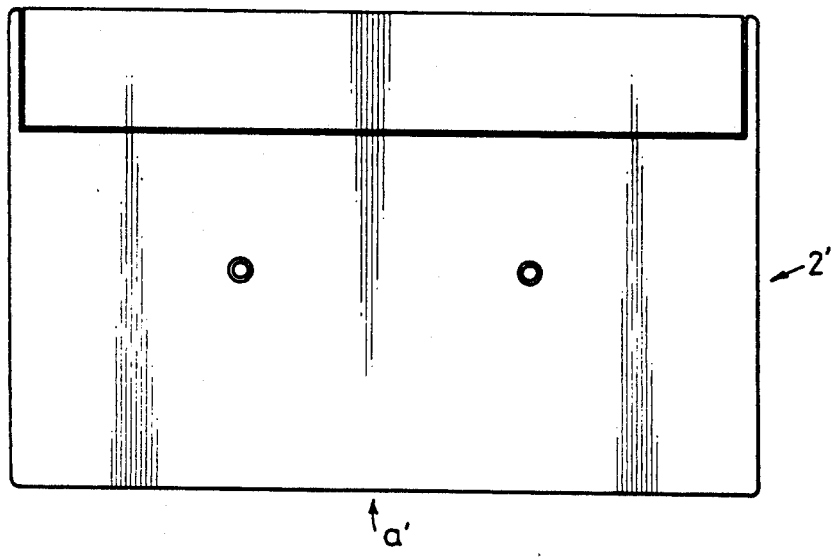
FIG. 5 is a rear view similar to FIG. 1 but showing another embodiment of the cassette tape case of the invention, with the inside layer formed from a thermoplastic elastomeric material.

The invention will now be described in more detail with reference to FIGS. 1 to 4. FIG. 1 is a front view of a case 2 built in accordance with this invention. The case 2 is illustrated as one formed from plastics to hold a magnetic recording medium, especially a cassette tape 4 (indicated by alternate long and two short dashes lines in FIG. 3). It comprises a cover 6 and a case body 8. The case 2 is constructed in the usual manner except that its outer surface is made wholly or partly of a layer of thermoplastic elastomeric material. The case body 8 has ribs 10 for supporting a cassette tape and lugs 12 for positioning the cassette, both formed inside in one piece with the body walls. The layer of thermoplastic elastomeric material formed on the outer surface of the case 2 abates noise such as clattering due to loosening of a stack of cases while in transport. This feature also improves the handleability of such cases.

In fabricating the case 2, a plastic material chosen from among polymethyl methacrylate (PMMA), acrylonitrile-styrene copolymer (AS), polycarbonate (PC), acrylonitrile-butadiene-styrene (ABS), polystyrene (PS), polybutylene terephthalate (PBT), high-impact polystyrene (Hi-PS), etc. is first shot into a mold (not shown) by primary injection molding technique to form a plastic layer 16. Next, a thermoplastic elastomer layer 14 is formed entirely or partly and integrally over the primarily injection molded inside layer by secondary injection molding. The elastomeric material is selected from the class consisting of styrenic type (e.g., a product marketed by Asahi Chemical Industry Co. under the trade designation "Toughtek"), olefin type (e.g., "Milastomer" marketed by Mitsui Petrochemical Industries), ester type (e.g., "Hytrel" by Toray-Dupont), urethane type (e.g., "Paraprene" by Nippon Polyurethane Industry or "Resamine" by Dainichiseika Color & Chemicals), polybutadiene, vinyl chloride and other types. A combination of an outside layer of polyurethane elastomer and an inside layer of PMMA will give particularly desirable result.

Figure 6:
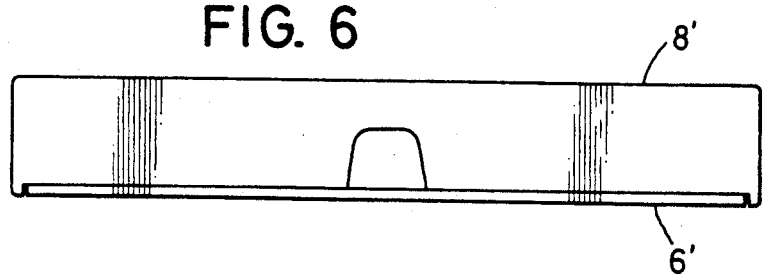
FIG. 6 is a side view, similar to FIG. 2, of the case of FIG. 5 as seen in the direction of the arrow a'.
Figure 9:
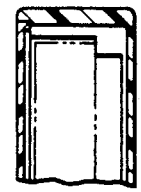
FIG. 9 is a fragmentary sectional view taken on the line IX—IX of FIG. 8.
Figure 7:
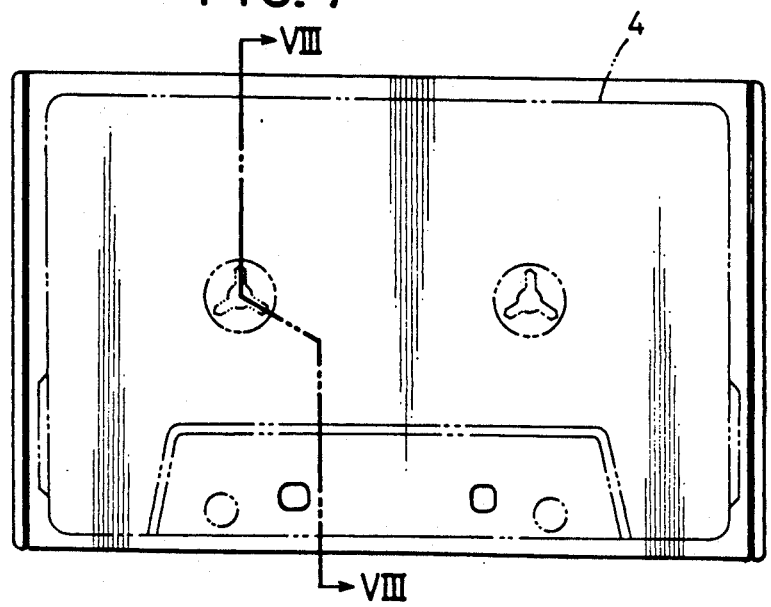
FIG. 7 is a front view like FIG. 3 of the case of FIG. 5.
Figure 8:
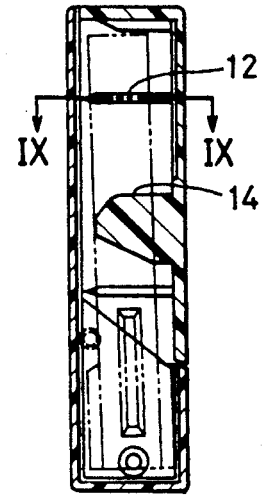
FIG. 8 is a transverse sectional view taken on the line VIII—VIII of FIG. 7.
Figure 10:
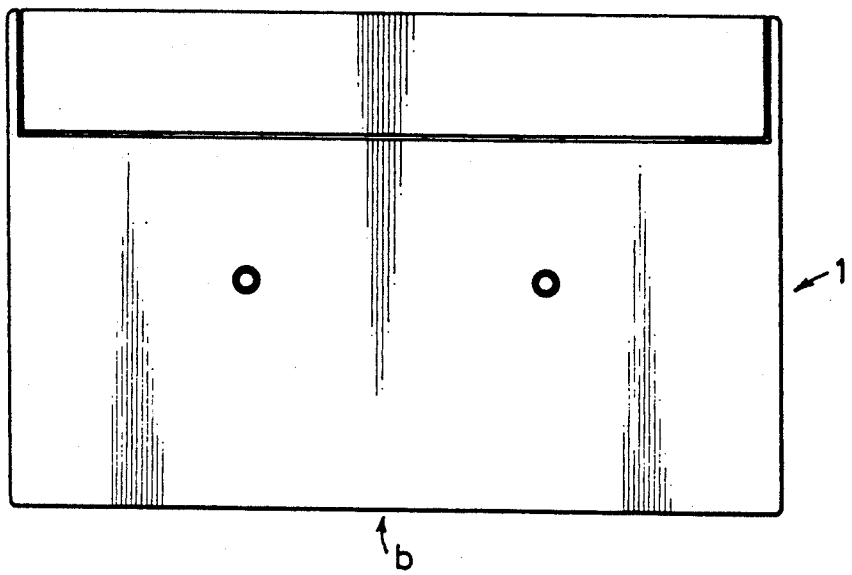
FIG. 10 is a rear view of a conventional case for holding a cassette case.
Figure 11:
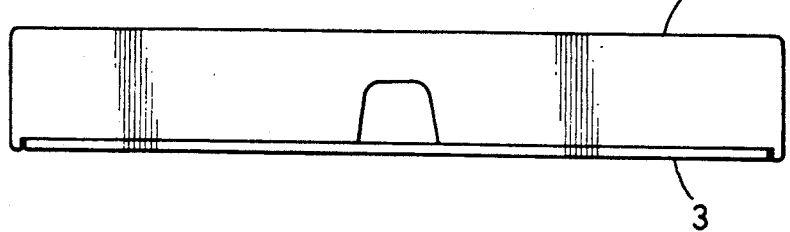
FIG. 11 is a side view as seen in the direction of the arrow b in FIG. 10.
Figure 12:
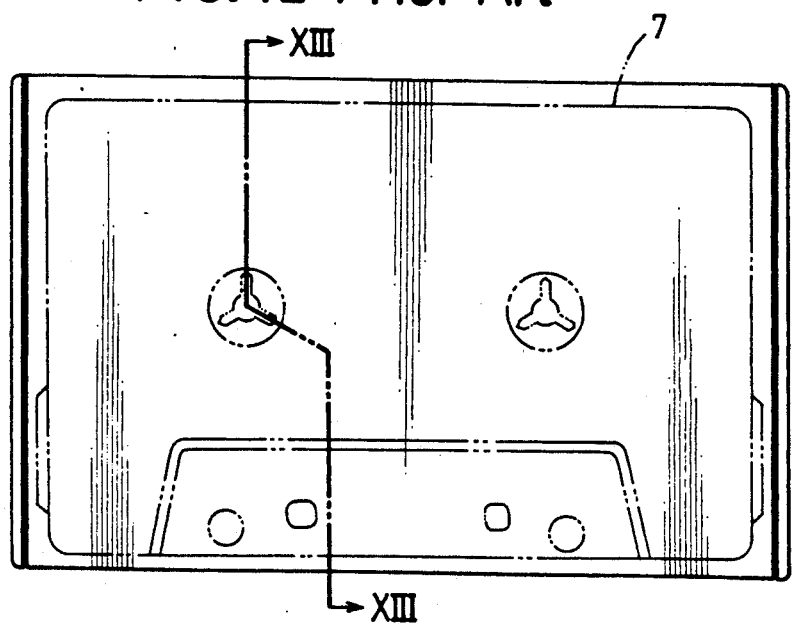
FIG. 12 is a front view of the case of FIG. 10.
Figure 13:
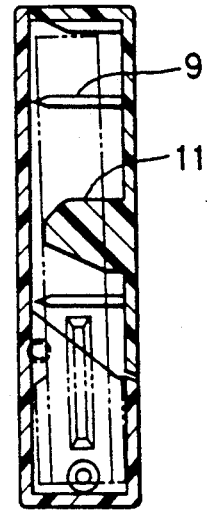
FIG. 13 is a transverse sectional view taken on the line XIII—XIII of FIG. 12.

FIGS. 5 to 9 show another embodiment of the case of the invention. Here the layer of thermoplastic elastomeric material is formed on the inner side of the case, thereby to control clattering, scuffing, and chipping of the case 2 and the cassette tape 4 contained therein that otherwise result from vibration during transportation or other handling. For the fabrication of the case 2, the procedure for the first embodiment that involves forming a layer of thermoplastic elastomeric material as the outside layer is reversed. First, a clear plastic material is primarily injection molded to form an outside layer, followed by secondary injection molding of a thermoplastic elastomeric material wholly or partly and integrally over the inner surface of the outside layer.

When the outside layer of the case is formed from a thermoplastic elastomeric material in conformity with the invention, the case can be fabricated to diversified configurations as desired. This obviously permits further improvements in the function and effect of the present invention. The invention, of course, is applicable not merely to the case for holding an audio cassette tape as shown but also to cases for video cassettes and floppy disks. Thermoplastic elastomer lacks mechanical stiffness in itself, but its combination with ordinary plastics gives cases with high enough mechanical strength to overcome the problems of the prior art.

For use in the manufacture of a case of the character described above, a thermoplastic elastomer should have a hardness usually within the range, in terms of JIS A hardness, from 70° to 98°. Generally the thermoplastic elastomer attains increased frictional resistance proportionally as the hardness decreases. A hardness outside the lower or upper limit, however, would lead to excess deformation of the thermoplastic elastomer due to too high an elasticity or to loss of texture and characteristics as such. It has been found that these can be avoided by premixing the thermoplastic elastomeric material with from 5 to 60% by weight of a fluoroplastic and that the addition renders it possible to maximize the aforesaid advantages that the thermoplastic elastomer offers. Examples of fluoroplastics are such proprietary ones as "Lubron" of Daikin Kogyo Co., "Nitoroflon" of Nitto Industry Co., and "Tefsel" of Mitsui Fluorochemical Co.

With the construction described above, the case of the invention offers the following advantages:

(1) The use of a thermoplastic elastomeric material for the outer layer makes the case easier to handle. When the case is handled outdoors, for example, for a car or headphone stereo, the danger of the case slipping out of the hand of an inattentive user is lessened. Even when let fall, the case will suffer only a minimum of damage because the impact is partly absorbed by the elastomeric material.

(2) Where a number of cases are to be carried or moved together, the thermoplastic elastomeric material constituting the outer layers of the individual cases prevents rattling of the cases hitting together and also scuffing and scratching due to rubbing against one another. Thus deterioration of the product quality is precluded.

(3) When a thermoplastic elastomeric material is used to form an inside layer of the case, the scuffing and scratching of the contained object, such as a cassette tape, and the case hitting together or the noise due to vibration can be prevented. Consequently, there is no possibility of the case and the object held therein producing dust owing to rubbing against each other and the dust, in turn, depositing on the tape surface and thereby increasing the dropout during subsequent playback.

While the invention has been described in its preferred embodiments, it is to be understood that various other modifications are possible within the spirit of the invention.

What is claimed is:

1. A combination tape cassette and case, said case comprising:
   a cover and a case body,
   said case body being made of a material consisting of a stiff thermoplastic first layer and an elastomeric second layer subsequently molded by an injection molding operation integrally over a surface of said first layer.

2. A combination according to claim 1 wherein said first layer is formed of a plastic material selected from the group consisting of polymethyl methacrylate, acrylonitrile-styrene copolymer, polycarbonate, acrylonitrile-butadiene-styrene, polystyrene, polybutylene terephthalate, and high-impact polystyrene.

3. A combination according to claim 1 wherein said elastomeric second layer material is selected from the group consisting of styrenic, olefinic, esteric, urethanic, polybutadienic, and vinyl chloride type thermoplastic elastomeric materials.

4. A combination according to claim 1 wherein the second layer is formed of a polyurethane elastomer.

5. A tape case comprising:
   a cover and a case body,
   said case body having lugs adopted to position a tape cassette,
   said case body being made of a material consisting of a stiff thermoplastic first layer and an elastomeric second layer subsequently molded by an injection molding operation integrally over a surface of said first layer.

6. A case according to claim 5 wherein said first layer is formed of a plastic material selected from the group consisting of polymethyl methacrylate, acrylonitrile-styrene copolymer, polycarbonate, acrylonitrile-butadiene-styrene, polystyrene, polybutylene terephthalate, and high-impact polystyrene and said second layer is formed of a thermoplastic elastomeric material selected from the group consisting of styrenic, olefinic, esteric, urethanic, polybutadienic, and vinyl chloride type thermoplastic elastomeric materials.

* * * * *